(Model.)
M. R. BISSELL.
Carpet Sweeper.
No. 233,596.　　　　　　　　Patented Oct. 26, 1880.
Fig. 1.
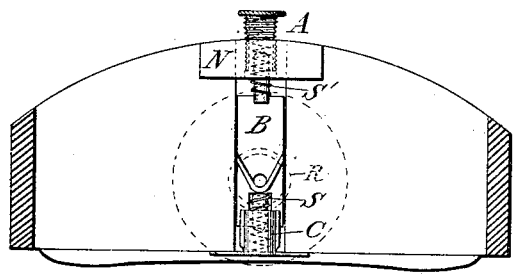
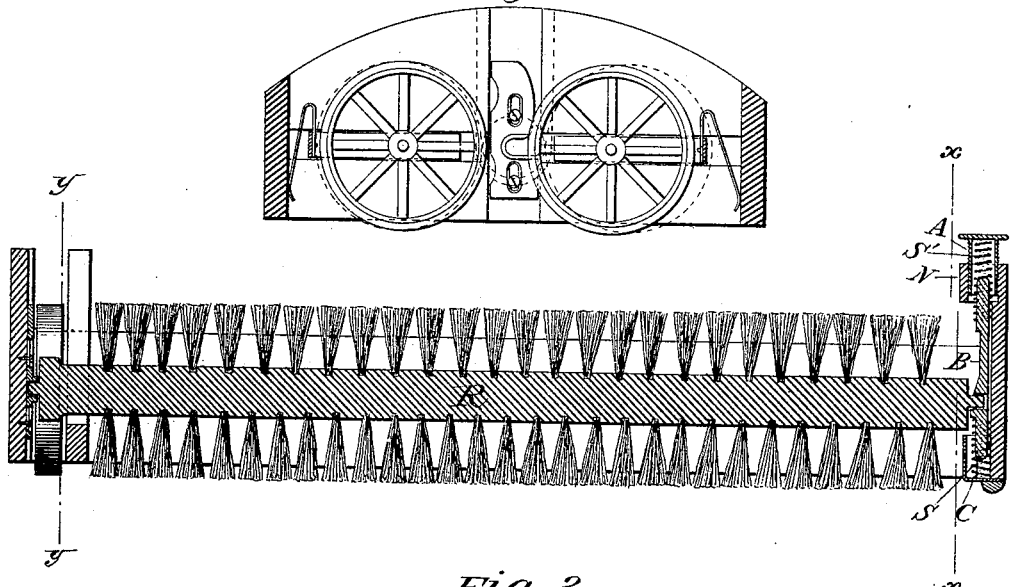
Fig. 2.
Fig. 3.
Witnesses:　　　　　　　　　　Inventor:
W. F. Lawton　　　　　　　　Melville R. Bissell
O. G. Wilson
N. PETERS, PHOTO-LITHOGRAPHER, WASHINGTON, D. C.

UNITED STATES PATENT OFFICE.

MELVILLE R. BISSELL, OF GRAND RAPIDS, MICHIGAN.

CARPET-SWEEPER.

SPECIFICATION forming part of Letters Patent No. 233,596, dated October 26, 1880.

Application filed June 15, 1880. (Model.)

*To all whom it may concern:*

Be it known that I, MELVILLE R. BISSELL, of the city of Grand Rapids, in the county of Kent and State of Michigan, have invented certain new and useful Improvements in Carpet-Sweepers, of which the following is a specification.

My invention relates to improvements in carpet-sweepers in which the brush-roller is adjusted vertically; and the object of my invention is to provide a vertical-sliding bearing for one or both ends of the brush-roller, adjusted by set-screws and springs, as hereinafter described. I attain this object by the mechanism illustrated in the accompanying drawings, in which—

Figure 1 is a cross-section taken on a line, $x\ x$, of Fig. 3. Fig. 2 is a cross-section taken on line $y\ y$, same figure, and Fig. 3 is a central longitudinal vertical section.

Similar letters refer to similar parts throughout the several views.

In Fig. 1, B represents the sliding bearing, which may be of metal and of any desirable form. It may have projections at either end, moving in ways or guides.

R is the end of the brush-roller. S S' are two spiral springs, arranged as shown, one at the upper end of the bearing and one at the lower end, together holding the bearing in the required position and yet allowing of a vertical motion. The upper spring, S', may be adjusted by means of the hollow screw A, which screw receives the upper way or guide and also engages with the nut N.

Instead of using the spiral springs S S', springs of any other form may be used; or the upper spring may be removed and the bearing used in connection with the lower spring alone.

C shows the guide for the lower end of the bearing.

Having thus described my invention, what I claim to have invented, and desire to secure by Letters Patent, is—

1. The combination of the brush-roller R, the vertically-moving bearing B, and the lower spring, S', when constructed and arranged substantially as described.

2. The combination and arrangement of the bearing B, brush-roller R, and springs S and S', substantially as described.

MELVILLE R. BISSELL.

Witnesses:
 EDWARD TAGGART,
 ARTHUR C. DENISON.